Jan. 21, 1964    R. F. COOPER ETAL    3,118,650
BALL VALVE CONSTRUCTION
Filed Feb. 28, 1961
FIG. 1.
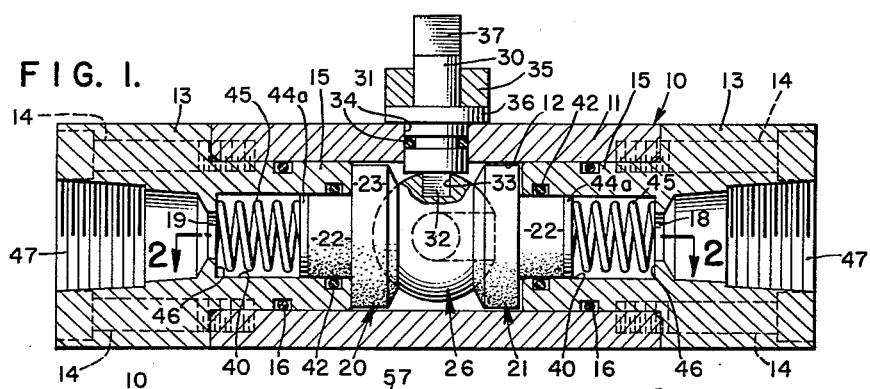
FIG. 2.
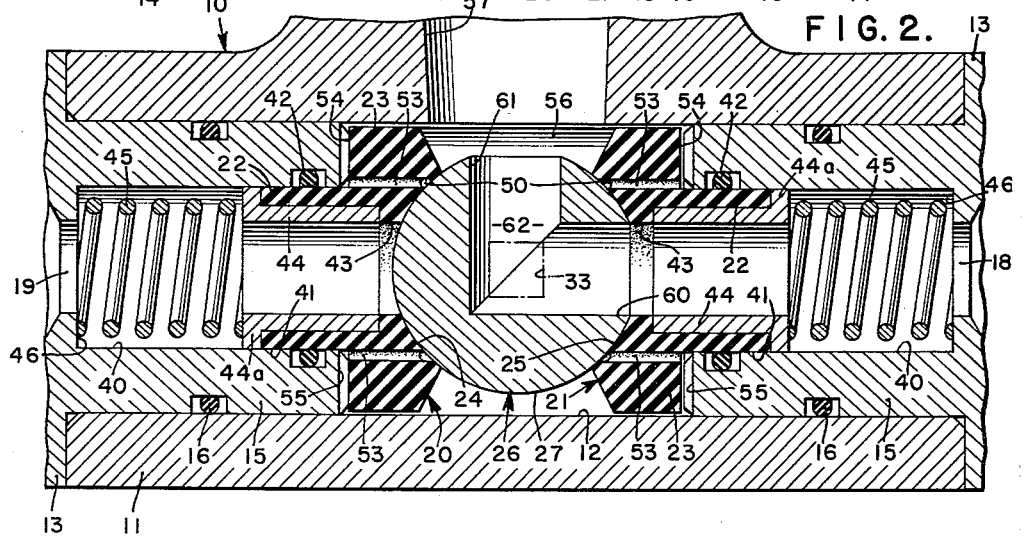
FIG. 3.
INVENTORS.
ROY F. COOPER
HUGO NYMAN
BY
ATTORNEYS.

3,118,650
BALL VALVE CONSTRUCTION
Roy F. Cooper, Downey, and Hugo Nyman, Whittier, Calif., assignors to Sargent Engineering Corporation, Huntington Park, Calif., a corporation of California
Filed Feb. 28, 1961, Ser. No. 92,240
5 Claims. (Cl. 251—172)

This invention relates to valves and parts therefor and is particularly directed to an improved form of valve using a ported ball member interposed between resilient seat members which contact the ball member.

It is an important object of this invention to provide a "free ball" construction in which the ported ball member is interposed between and supported wholly by contact with resilient seat members having spherical seating surfaces. It is another object to provide such a device in which the resilient seat members are pressure loaded so that the sealing force is increased on the upstream side of the ball member upon increase in upstream pressure. Another object is to provide a device of this type in which the resilient seat members seal against the ball member on both upstream and downstream sides. Another object is to provide a three-way valve construction employing a ball member wholly supported between confronting spherical surfaces on resilient seat members. Another object is to provide relatively broad seating surfaces on resilient seat members in which novel means are employed for unloading a portion of the seating surfaces from sealing forces developed in response to upstream or downstream pressures. A related object is to provide a three-way ball valve construction in which relatively low torque loads are required for turning the ball member relative to the contacting surfaces of the seat members. Other and more detailed objects will appear hereinafter.

In the drawings:

FIGURE 1 is a transverse sectional view showing a preferred embodiment of our invention.

FIGURE 2 is a sectional view on an enlarged scale taken substantially on lines 2—2 as shown in FIGURE 1, and showing the ball member in one position.

FIGURE 3 is a sectional view similar to FIGURE 2 showing the ball member in another position.

Referring to the drawings, a housing generally designated 10 includes a shell 11 having a central cylindrical bore 12. The housing includes a pair of annular elements 13 secured to the shell 11 by means of threaded fastenings 14. Each of the elements 13 has a cylindrical projection 15 received in sliding relationship within the cylindrical bore 12 and sealed with respect thereto by means of an O-ring 16.

Duplicate seat members 20 and 21 are positioned within the cylindrical bore 12 and each is provided with an axial tube 22 and an end flange 23. The axial length of the tube 22 is on the order of the axial length of the flange 23. The seat members are formed of resilient material such as, for example, the material marketed under the trademark Hycon by E. I. du Pont de Nemours & Co. The seat members 20 and 21 are provided with confronting seating surfaces 24 and 25, each comprising a portion of a sphere. A ball member 26 having a spherical outer surface 27 is positioned within the bore 12 and interposed between seating surfaces 24 and 25. The ball member 26 is wholly supported by surfaces 24 and 25.

Means are provided for turning the ball member 26 within the housing 10, and as shown in the drawings, this means includes a transverse shaft 30 having a portion projecting through a lateral opening 31 in the housing sleeve 11. The inner end 32 of the shaft 30 is square and is loosely received within a square aperture 33 provided in the ball member 26 and O-ring 34 on the shaft 30 prevents leakage between the shaft and the housing sleeve 11. A bridge element 35 fixed to the housing shell 11 by means, not shown, overlies a flange 36 formed on the shaft 30 and serves to hold the shaft in operative position. A square exposed end 37 is available for turning the shaft 30 and thereby turning the ball member 26.

The elements 15 serve as inlet and outlet conduits and each is provided with a concentric bore 40 which slidably receives the outer surface 41 of the tube portion 22 of each of the seat members 20 and 21. Leakage between the concentric bores 40 and tubes 22 is prevented by means of O-rings 42. Each of the seat members 20 and 21 is provided with a central opening 43 which defines the inner boundary of the seating surfaces 24 and 25. Each of the seat members 20 and 21 is provided with a metal shell 44 having an end flange 44a. The central opening 43 is aligned with the opening in the shell 44. A coil spring 45 mounted within the concentric bore 40 engages the flange 45 at one end and engages a shoulder 46 at the other end. The shoulder 46 is provided on the element 15. Internally threaded sockets 47 are also provided on the elements 15 for connection to hydraulic hoses, not shown. The springs 45 serve to apply an end force of relatively small magnitude to the tubes 22 to hold the surfaces 24 and 25 in contact with the ball element 26.

Since the end flanges 44a are exposed to hydraulic pressures existing in the concentric bores 40, an end force of relatively great magnitude is applied to these flanges 44a by such pressures. This end force is applied by the seat members 20 and 21 to the ball member 26. In order to reduce ball contacting area of the seat members which is subjected to the endwise force, we provide a circular groove 50 in each of the seating surfaces 24 and 25. The inner portion of the seating surfaces which lies radially inward of circular groove 50 is designated as a primary seating surface 51 while the remaining portion of the seating surface radially outward of the circular groove 50 is designated as the secondary seating surface 52. A plurality of passages 53 are provided within the seat members 20 and 21. These passages extend from the circular groove 50 to the rear face 54 of the end flange 23. Since radial grooves 55 in the end face of the elements 15 prevent sealing of the flanges 23 with respect to the elements, the passages 53 in effect establish communication between the circular groove 50 and the space 56 within the cylindrical bore 12. Accordingly, the primary seating surfaces 51 radially within the groove are pressure loaded while the secondary seating surfaces 52 radially outward of the groove 50 are not pressure loaded and serve only to assist in maintaining the ball member in central position.

A side outlet 57 is provided in the shell 11 of the housing 10. This outlet intersects the bore 12 at a location between the seat members 20 and 21. The ball member 26 is provided with a pair of angularly spaced ports 60 and 61 for registry with the central openings 43 and these ports are connected by the internal passage 62. The ports 60 and 61 are preferably spaced 90° apart.

In operation, the ball member 26 may be positioned as shown in FIGURE 2 to connect the central opening 43 in the seat member 21 with the side outlet 57. Pressure of hydraulic fluid in the inlet 18 acts against the flange 45 of the shell 44 and applies an endwise sealing force to the primary seating surface 51 on the seat member 21. This endwise force on the ball member supplemented by the force of the hydraulic fluid applied directly to the ball member 26 within the opening 43 acts to move the ball member 26 slightly to the left as viewed in the drawings to develop a sealing force between the seating surface 24 on the seat member 20. The annular shoulder 54 on the seat member 20 resists motion to the left of the ball member 26.

The ball 26 may be turned from the position shown in FIGURE 2 to the position shown in FIGURE 3, or vice versa by turning the exposed square end 37 of the lateral shaft 30.

With the ball member in the position shown in FIGURE 3, the pressure of hydraulic fluid in the inlet 18 seals primary seating surface 51 of the seat member 21 against the spherical surface of the ball 26. The endwise sealing force applied to this primary seating surface 51 supplemented by the force applied by the hydraulic fluid directly to the spherical surface 27 through the central opening 43 compresses flange 23 of the seat member 20 against the shoulder 54.

It will thus be apparent that the pressure of hydraulic fluid within the inlet 18 acts to seal ball member 26 on both upstream and downstream sides. Furthermore, this action takes place whether the ball member 26 is in position to connect the side outlet 57 to the inlet 18 or outlet 19. Since the parts are symmetrical and since the seat members 20 and 21 are identical, the port 19 may be used as the inlet and port 18 used as the outlet. Both upstream and downstream sides of the ball are sealed by pressure in the inlet in either case.

If a three-way valve is not required, and it is only necessary to provide a shutoff valve which is either open or closed, the side outlet 57 may be omitted and the ports 60 and 61 placed in axial alignment with a straight passage connecting them. The function and operation of the seat members 20 and 21 remains unchanged.

Having fully described our invention, it is to be understood that we do not wish to be limited to the details set forth herein but our invention is of the full scope of the appended claims.

We claim:

1. In a ball valve construction, the combination of: a housing having a central bore, a pair of resilient seat members positioned within said bore, each seat member having a seating surface comprising a portion of a sphere, a ball member within said housing bore interposed between and supported by said resilient seat members and contacting both of said seating surfaces, each resilient seat member having a central opening and each having a groove in its seating surface concentric with its central opening, said groove defining a primary seating surface radially inward of said groove and a secondary seating surface radially outward of said groove, passage means within each resilient seat member communicating with said groove and with space within said central bore, inlet and outlet conduits on the housing each communicating with one of said central openings, respectively, means responsive to pressure in said conduits for applying a sealing force to each of said pirmary seating surfaces, respectively, said ball member having a port for registry with at least one of said central openings, and means for turning the ball member within said housing.

2. In a ball valve construction, the combination of: a housing having a central cylindrical bore, a pair of annular resilient seat members positioned within said bore, said seat members having confronting seating surfaces each comprising a portion of a sphere, a ball member within said housing bore interposed between and supported by said resilient seat members and contacting both of said seating surfaces, each resilient seat member having a central opening and each having a circular groove in its seating surface concentric with its central opening, said circular groove defining a primary seating surface radially inward of said groove and a secondary seating surface radially outward of said groove, passage means within each resilient seat member communicating with said groove and with space within said central bore, inlet and outlet conduits on the housing each communicating with one of said central openings, respectively, means responsive to pressure in said conduits for applying an axial force to each of said primary seating surfaces, respectively, said ball member having a port for registry with at least one of said central openings, and means for turning the ball member within said housing.

3. In a ball valve construction, the combination of: a housing having a central cylindrical bore, a pair of annular resilient seat members positioned within said bore each comprising an axial tube and an end flange, each end flange having a seating surface comprising a portion of a sphere, a ball member within said housing bore interposed between and supported by said end flanges and contacting both of said seating surfaces, each resilient seat member having a central opening extending through the end flange and the tube and forming the inner boundary of its seating surface, each end flange having a circular groove in its seating surface concentric with the central opening, said circular groove defining a primary seating surface radially inward of said groove and a secondary seating surface radially outward of said groove, passage means within each resilient seat member communicating with said groove and with space within said central bore, inlet and outlet conduits on the housing each communicating with one of said central openings, respectively, means responsive to pressure in said inlet conduit for applying a sealing force to said axial tube and primary seating surface of one of said resilient seat members, said ball member having a port for registry with the central opening of the latter said seat member, and means for turning the ball member within said housing.

4. In a ball valve construction, the combination of: a housing having a central bore, and having annular elements seated in opposite ends of said bore, an annular resilient seat member mounted on each of said annular elements and positioned within said bore, each comprising an axial tube and an end flange, each end flange having a seating surface comprising a portion of a sphere, a ball member within said housing bore interposed between and supported by said end flanges and contacting both of said seating surfaces, each resilient seat member having a central opening extending through the end flange and the tube and forming the inner boundary of its seating surface, each end flange having a circular groove in its seating surface concentric with its central opening, said circular groove defining a primary seating surface radially inward of said groove and a secondary seating surface radially outward of said groove, passage means within each resilient seat member communicating with said groove and with space within said central bore, inlet and outlet connections on said annular elements each communicating with one of said central openings, respectively, means responsive to pressure in said inlet connection for applying a sealing force to one of said primary seating surfaces, said ball member having a port for registry with at least one of said central openings, and means for turning the ball member within said housing.

5. For use in a ball valve construction, the subcombination of: an annular resilient seat member provided with a circular flange having a seating surface on one side comprising a portion of a sphere, said flange having a rear face on the other side, said annular resilient seat member including a concentric cylindrical tube projecting axially from the rear face of said circular flange, the axial length of said tube being on the order of the axial length of said flange, said seat member having a central opening forming the inner boundary of said seating surface and having a circular groove in its seating surface concentric with its central opening, and passage means extending axially through said end flange and communicating with said groove and with said rear face of said end flange.

References Cited in the file of this patent

UNITED STATES PATENTS

| | | |
|---|---|---|
| 2,698,731 | Koehler | Jan. 4, 1955 |
| 2,788,015 | Scherer | Apr. 9, 1957 |